United States Patent [19]

Jung

[11] Patent Number: 4,654,061

[45] Date of Patent: Mar. 31, 1987

[54] GEOTHERMAL STEAM SEPARATOR

[75] Inventor: Douglas B. Jung, Santa Rosa, Calif.

[73] Assignee: Union Oil Company of California, Los Angeles, Calif.

[21] Appl. No.: 739,903

[22] Filed: May 31, 1985

[51] Int. Cl.⁴ .............................................. B01D 45/12
[52] U.S. Cl. ........................................ 55/452; 55/447
[58] Field of Search ...................... 55/1, 452, 453, 456, 55/457, 348, 447; 122/34; 60/641.2

[56] References Cited

U.S. PATENT DOCUMENTS

| 445,472 | 1/1891 | Manning . | |
|---|---|---|---|
| 2,192,214 | 3/1940 | Wier . | |
| 2,259,032 | 10/1941 | Fisher . | |
| 2,425,588 | 8/1947 | Alexander . | |
| 2,538,195 | 1/1951 | Henkel | 55/456 |
| 2,960,184 | 11/1960 | Dietlhauser | 55/452 |
| 3,251,176 | 5/1966 | Gleason . | |
| 3,318,077 | 5/1967 | Skopek . | |
| 3,614,863 | 10/1971 | Patterson et al. | 55/452 |
| 3,813,854 | 6/1974 | Hortman . | |
| 3,884,600 | 5/1975 | Perry et al. | 55/456 |
| 4,187,089 | 2/1980 | Hodgson | 55/457 |
| 4,238,210 | 12/1980 | Regehr et al. | 55/452 |
| 4,261,708 | 4/1981 | Gallager . | |

FOREIGN PATENT DOCUMENTS 2035151  6/1980  United Kingdom ................... 55/457

Primary Examiner—Bernard Nozick
Attorney, Agent, or Firm—Dean Sandford; Michael C. Schiffer; Montgomery W. Smith

[57] ABSTRACT

A device for separating liquid droplets and solids out of a geothermally produced vapor stream traveling under pressure through a pipeline comprising a first means for inducing a force in the vapor stream to induce the droplets and solids to migrate to the pipelines inner wall and a second downstream means for collecting those droplets and solids.

12 Claims, 3 Drawing Figures

GEOTHERMAL STEAM SEPARATOR

BACKGROUND OF THE INVENTION

The present invention relates to an apparatus useful for separating liquids and/or solids from a geothermal water vapor stream.

The removal of denser material from a moving vapor stream is desirable in many applications such as removing various liquid droplets and entrained solids from water vapor. Specifically, it is highly desirable to remove liquid droplets and entrained solids from a vapor stream which is used in the steam generation of electricity. Liquid droplets and entrained solids in the vapor stream can cause wear, scaling, and corrosion of the turbine blades, nozzles, and other turbine components of the steam-generation facility. This problem of wear, scaling, and corrosion of turbine components is especially apparent in geothermal steam generation where water droplets, present in the vapor due to the presence of water in the subterranean formation or the result of injecting water into the subterranean formation, dissolve and carry various minerals present in the formation in the vapor stream. These dissolve and minerals may deposit upon the turbine and within valves of the electrical generation apparatus, adding to the corrosion, scaling, and wear of the apparatus, which may eventually lead to blockage of the various turbine components.

Geothermally produced vapor may consist of from about 5 to 10,000 times more dissolved solids than vapor produced by other heating methods. In order to lessen to damage resulting from corrosion, scaling, and wear of turbine components of the steam-generating apparatus, it is beneficial to separate out about 90 percent of the solids, such as minerals, dissolved or carried by the geothermal vapor.

Previously used separators are rather large devices into which a vapor stream is diverted to remove liquid droplets and dissolved or carried solids. Examples of these types of devices are shown in U.S. Pat. Nos. 4,445,472 and 3,251,176.

A major disadvantage of these types of separating devices is that, as a vapor stream leaves the pipeline and enters into the larger vessel, a transitional turbulence is created which causes shearing and reduction of number and size of the liquid droplets. As the liquid droplets decrease in number and size, the efficiency of removing the particles decreases. Thus, the very use of these types of separators increases the potential that liquid droplets and entrained impurities will enter a steam-generation facility. Furthermore, as the quantity of liquid droplets decreases, the entrained solids concentrate in the remaining droplets, increasing the potential of these solids to come out of solution and deposit upon the turbine components.

In typical geothermal operations, it is desirable to use more than one and usually different types of separating devices for each feed pipeline, because of the need to remove a sufficient amount of liquid droplets and entrained solids from the vapor in order to minimize corrosion and wear. The increased number of separators intensifies the turbulence, resulting in increased shearing and reduction of the quantity and size of the liquid droplets, and thus the loss of efficiency of removal of the liquid droplets and entrained solids.

In conjunction with the larger separator, some smaller in-line separators may be used to assist in the removal of liquid droplets and entrained solids. The small in-line separators are used to reduce the cost of removing liquid droplets and entrained solids from the vapor, but are inefficient in and of themselves and cannot be used independently to remove a sufficient amount of the liquid droplets and entrained solids to minimize corrosion and wear.

SUMMARY OF THE PRESENT INVENTION

The present invention is directed to a process and an apparatus which is useful for removing liquid droplets and entrained solids from a vapor stream, particularly from a geothermally produced aqueous vapor stream used in the steam-generation of electricity. The apparatus is positioned within a pipeline carrying the vapor stream and is comprised of a first means for inducing a migration of the liquid droplets and entrained solids towards the inner surface of the pipeline and a second means for collecting substantially all of the liquid droplets and entrained solids which have migrated to the inner surface.

The present invention is founded, at least in part, on the discovery that the efficiency of removing liquid droplets and entrained solids is dependent upon the distance between the first and second means, with the distance required to obtain efficiency being at least two diameters of the pipeline.

BRIEF DESCRIPTION OF THE DRAWINGS

The present invention may be better understood and its advantages will be apparent to those skilled in the art by reference to the accompanying drawings, wherein like reference numerals refer to like elements in the several figures.

DESCRIPTION OF THE PREFERRED EMBODIMENT

Figure 1:
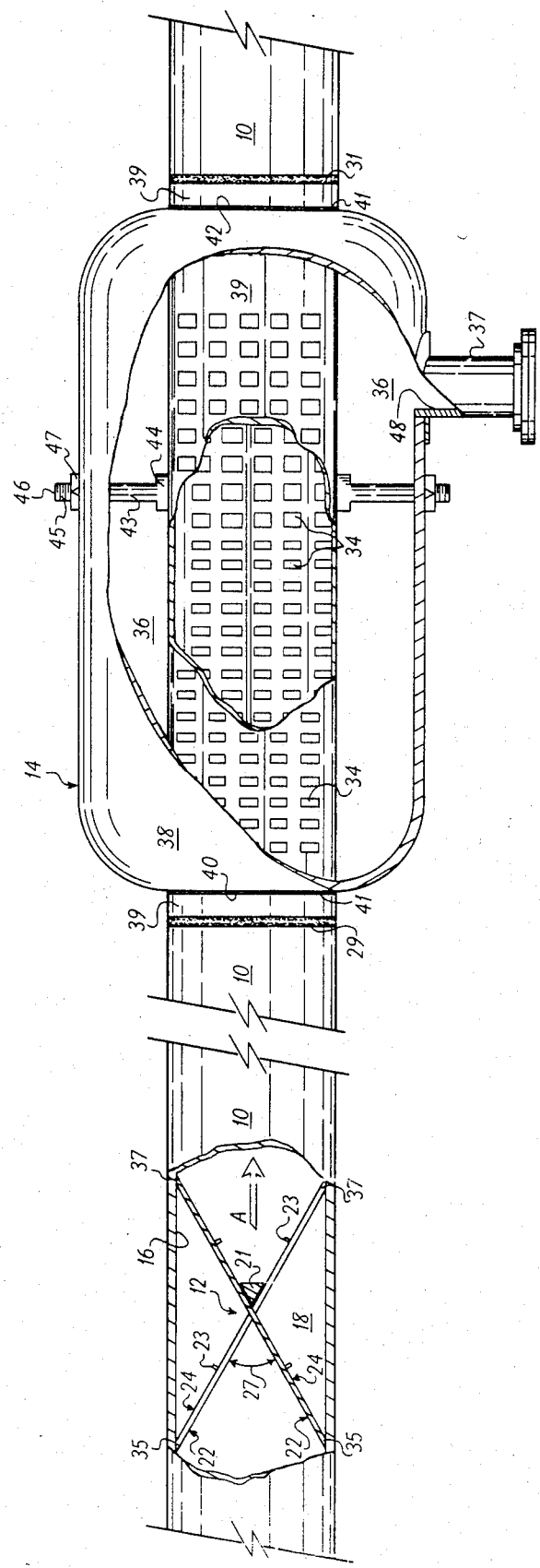
FIG. 1 is a partial cut-away view of a separating apparatus and a pipeline in accordance with the preferred embodiment of this invention, with a portion of the pipeline between the inducer and collecting means sectioned away for purposes of illustration.

The separating apparatus of this invention is especially useful for separating liquid droplets and/or dissolved solids from a vapor stream used to turn turbines of steam-electric generation apparatus. The vapor stream may be generated by any number of conventional means, such as by heating water or other equivalent liquid to its vapor point using conventional fossil fuels, nuclear fuels, or, in accordance with the preferred embodiment of the present invention, a geothermal source. The various means for and methods of heating water or other equivalent liquid to its vapor point are known to those skilled in the art and will not be discussed any further herein. Once a liquid has been heated to its vapor point, it is transported to its intended destination, a turbine of an electric-generating apparatus, through a pipeline. The turbine and other electric-generating apparatus have not been shown in the drawings and will not be discussed herein since these are not critical to the invention.

The vapor stream carries along with it droplets of the liquid used to produce it and dissolved solids, e.g., minerals. When this vapor stream is produced by a geothermal process, substantial quantities of solids, e.g., minerals, will be carried by entrainment and/or dissolution. Typically, the liquid droplets and dissolved solids will be present at from about 1 to 10 weight percent of the vapor. In order to reduce wear, corrosion, and scaling of the turbine and other electric-generation apparatus, a substantial portion of the liquid droplets and/or dissolved solids must be removed.

Figure 2:
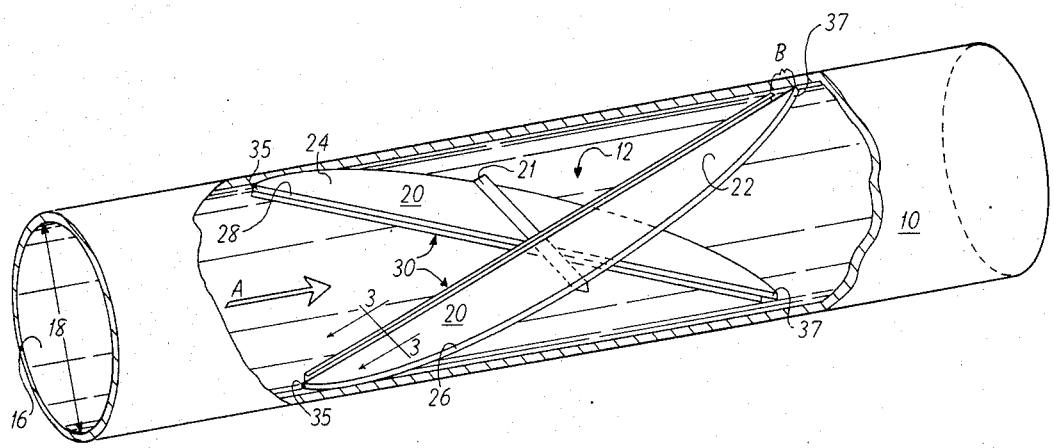
FIG. 2 is a cutaway of a pipeline to show an inducer used to cause the swirling motion in the vapor stream in accordance with the preferred embodiment of this invention.

Referring to FIGS. 1 and 2, a partial cut-away view of a pipe 10 and a separating apparatus which comprises a spin inducer 12, which is fitted into pipe 10, and a collector 14, which is formed partially from pipe 10, is seen. Pipe 10 has an inner surface 16, which defines a circular passageway 18 through which the vapor stream flows, in the direction as indicated by arrow A to the electric-generating apparatus.

Spin inducer 12 comprises two blades 20, which are preferably of a semi-elliptical shape. Each blade 20 comprises two opposing planar surfaces 22 and 24, as best seen in FIG. 1, with a first edge 26, which is also preferably semi-elliptical, and a second edge 28, which is generally straight, between said surfaces 22 and 24. Surface 22 of each blade 20 will be the surface that the vapor stream impinges upon as it flows through pipe 10 in direction A. These blades 20 are preferably diagonally positioned within pipe 10, such that an angle 27, as best seen in FIG. 1, is formed between second edges 28 of each blade 20. Angle 27, which will be somewhat dependent on the length of the blades 20, as measured by the length of edge 28, will be from about 40° to about 90°, preferably about 60°. The overall length of each blade 20 will be dependent upon the diameter of the pipe 10 being used, but generally will range from about 2 to about 12 feet.

Blades 20 may be secured within pipe 10 by any suitable means, such as by welding. As shown in FIGS. 1 and 2, blades 20 are held diagonally in place with respect to each other by a triangularly shaped block 21, whose sides contact surfaces 24 of blades 20 at the desired angle 27 for the blades 20. Blades 20 are then secured to inner surface 16 by welding at tabs 23.

As the vapor stream travels across blades 20, it is split into two helical flow patterns creating a rotational movement in the vapor stream. The rotational movement in the vapor stream generates an outward force, believed to be a centrifugal force, which induces the liquid droplets and/or dissolved solids to be forced outward against and onto the inner surface 16 of pipe 10. Blades 20 may be of any configuration or arrangement so long as a rotational or swirling movement is developed in the vapor stream as it passes through pipe 10 across blades 20. This vapor stream will typically be moving at a rate of from about 25 to about 250 feet per second, so it is highly desirable that the configuration and arrangement of blades 20 be such that turbulence is minimized. Excessive turbulence will create a shearing and reduction in size of the liquid droplets, which as discussed above, reduces efficiency in removing droplets and solids from vapor stream.

Figure 3:
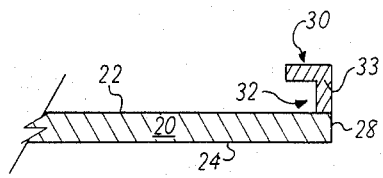
FIG. 3 is a partial, cross-sectional view of one blade of the inducer taken substantially along line 3—3 of FIG. 2.

While the centrifugal force created by the rotational or swirling movement in the vapor stream may be sufficient to force the liquid droplets and/or dissolved solids against and onto inner surface 16, it is preferable to use a means to capture and guide the liquid droplets and/or dissolved solids that have impinged upon and are forced across the surface 22 of each blade 20 towards the inner surface 16 of pipe 10. As best seen in FIGS. 2 and 3, this guide means 30 preferably comprises a C-shaped cavity 32 which may be formed by bending the blade 20 along edge 28 or preferably securing on surface 22 at edge 28 of each blade 20 an L-shaped member 33, so as to form the cavity 32, as defined by surface 22 and the L-shaped member 33. This cavity 32 should be large enough to hold a sufficient amount of liquid droplets and entrained solids that would impinge upon the surface 22 for a given vapor stream over a given period of time as determined by the velocity and the weight percent of solid and liquid droplets carried by the vapor stream. Generally, the cavity will be from about 1 to about 4 inches deep and from about 0.5 to about 1 inch high.

Guide means 30 traverses edge 28 from its leading end 35, the upstream end, to within a short distance from the opposite trailing end 37. The distance, as shown by distance B, between the termination of guide means 30 and trailing end 37 should be sufficient enough to allow the release of collected liquid droplets and/or solids onto the inner surface 16 of pipe 10. Typically, this distance will be at least 1 inch, preferably from about 1 to about 6 inches.

Thus, as the vapor stream passes through the inducer 12, those liquid droplets and/or dissolved solids that impinge upon and travel across surface 22 are captured and guided towards the inner surface 16 by guide means 30 and are further forced against and onto surface 16 by the rotational or swirling motion induced in the vapor stream by inducer 12. Furthermore, any droplets and/or dissolved solids which have not been captured by guide means 30 are forced outwards against and onto inner surface 16 by the rotational or swirling motion of the vapor stream created by inducer 12. These droplets and/or dissolved solids forced against and onto inner surface 16 are collected and removed from passageway 18 by a collector 14 positioned downstream of inducer 12.

Collector 14 comprises a body 39 and encasement 38 which define a reservoir 36. Body 39 is provided with perforations 34 through which the liquid droplets and entrained solids pass into reservoir 36 and accumulate. Body 39 may be formed from any type of conduit, such as a cylindrical conduit, which can be positioned in alignment with and secured to pipe 10, such as by welding at 29 and 31. Preferably, body 39 is formed from a section of pipe 10. The configuration of each perforation 34 should be such as to minimize turbulence. Preferably, each perforation 34 will have a rectangular configuration, with a cross-sectional area from about 0.2 to about 2 square inches. Preferably, the cross-sectional area of the perforations 34 will increase downstream, with those perforations at the furthest point downstream two to five times larger than those upstream. This allows vapor which enters reservoir 36 to re-enter the passageway 18 downstream with minimal turbulence. Reservoir 36 is provided at opposite ends with cutouts 40 and 42. Cutouts 40 and 42 have a configuration to allow encasement 38 to be positioned about body 39. Any void between cutouts 40 and 42 and the outer surface of body 39 is sealed to prevent any pressure drop within cavity 18 of pipe 10, e.g., welding at 41 and 41'.

Encasement 38 may be further supported about pipe 10 using support posts 43 which have a first end 44 abutting the outer surface of pipe 10 and a second end 46, which is secured to encasement 38 by any suitable means, such as by providing second end 46 with threads 45 to which a nut 47 is secured to and down upon encasement 38. Securing encasement 38 to pipe 10 in this manner minimizes any vibrational damage to collector 14 as the vapor stream passes through pipe 10 and perforations 34. It is also preferable to provide collector 14 with a means for removing the accumulated liquids and solids within reservoir 36, such as an exhaust valve or port 37, which is in fluid communication with reservoir 36 via a cutout 48 through encasement 38.

In order to remove substantially all the liquid droplets and/or dissolved solids from the vapor stream, which is about 90 percent of the initial amount, it has been determined that collector 14 must be positioned downstream from spin inducer 12 at a distance equal to at least two times the inner diameter of body 39, preferably from about 2 to about 20 diameters, and still more preferably, from about 10 to about 20 diameters.

While it is feasible to provide the inducer 12 and collector 14 into a one-piece assembly, the resulting structure, as a result of the required distance between inducer 12 and collector 14 with a typical length using a 4-foot diameter inlet pipe of from about 60 feet to over 200 feet for the separating apparatus, would be too long for transportation. Therefore, it is preferable that the separating apparatus of this invention is provided in two parts. The inducer is secured into one pipe section with another pipe section provided with collector 14. This allows for the spatial adjustment of inducer 12 and collector 14 at the site.

While the preferred embodiments have been described and illustrated, various modifications and substitutions may be made thereto without departing from the spirit and scope of this invention. Accordingly, it is to be understood that the present invention has been described by way of illustration and not limitation.

I claim:

1. An apparatus for removing entrained liquid droplets and solids from a vapor stream, under pressure, comprising:
    a pipe having an inner wall defining the passageway through which said vapor stream moves from upstream to downstream,
    a means for causing said liquid droplets and solids to impinge upon and travel across said pipe inner wall comprising:
        a means for inducing a helical flow pattern in said moving vapor stream to establish a sufficient outward force to cause said liquid droplets and solids to migrate to said pipe inner wall, said inducing means comprising two semi-elliptical blades having first and second opposing planar surfaces separated by a first semi-elliptical edge and a second generally straight edge, said blades diagonally positioned from the horizontal at an angle from about 40° to about 90° from each other, with said first surface facing said vapor stream, said blades secured to said pipe within said pipe passageway with said first edge of each blade flush with said pipe inner wall and each of said second edges contacting the other said blade second edge at about midpoint; and
        a means for containing and guiding said liquid droplets and solids onto said pipe inner wall, said containing and guiding means being associated with said inducing means such that said liquid droplets and solids are contained and guided simultaneous with the inducement of said helical flow pattern, said containing and guiding means including a receptacle traversing said first surface along said second edge with an opening along and traversing said first surface; and
    a means for collecting said droplets and solids that have impinged upon said pipe inner wall comprising:
        a vessel means defining a passageway in fluid communication with said pipe passageway,
        a fluid tight holding means in fluid communication with said vessel means through perforations through which said liquid droplets and solids pass into said fluid tight holding means while maintaining said pressure of said vapor stream, said perforations commencing at least two diameters of said pipe passageway from said first means; and
        a means for withdrawing said liquid droplets and solids from said fluid tight holding means while maintaining said pressure.

2. The apparatus of claim 1 wherein said receptacle terminates at least 1 inch from that end of said second edge closest said collecting means.

3. The apparatus of claim 2 wherein said receptacle terminates from about 1 to about 4 inches from said second edge end.

4. The apparatus of claim 2 wherein said vessel is a tubular conduit and said perforations are arranged as a series of parallel rows of orifices through said conduit.

5. The apparatus of claim 4 wherein said orifices are generally rectangular with a cross-sectional area from about 1 to about 2 square centimeters.

6. The apparatus of claim 5 wherein said fluid tight holding means is an enclosure surrounding said tubular conduit.

7. The apparatus of claim 6 wherein said orifices furtherest from said inducing means are from about 2 to about 5 times larger in surface area than those orifices closest said inducing means.

8. The apparatus of claim 7 wherein said withdrawing means is a valve.

9. An apparatus for removing entrained liquid droplets and solids from a vapor stream moving, under pressure, comprising:
    a pipe having an inner wall defining a passageway through which said vapor stream moves,
    a means for causing said liquid droplets and solids to impinge upon and travel across said pipe inner wall comprising:
        a means for inducing a helical flow pattern in said moving vapor stream to establish a sufficient outward force to cause said liquid droplets and solids to migrate to said pipe inner wall, said inducing means comprising two semi-elliptical blades having first and second opposing planar surfaces separated by a first semi-elliptical edge and a second generally straight edge, said blades diagonally positioned from the horizontal at an angle from about 40° to about 90° from each other, with said first surface facing said vapor stream, said blades secured to said pipe within said pipe passageway with said first edge of each blade flush with said pipe inner wall and each of said second edges contacting the other said blade second endge at about midpoint; and
        a means for containing and guiding said liquid droplets and solids onto said pipe inner wall, said containing and guiding means comprising a receptacle traversing said first surface along said second edge of each blade with an opening along and traversing said first surface of each blade so that said droplets and solids are contained and guided simultaneous with the inducement of said helical flow pattern; and a means for collecting said liquid droplets and solids that have migrated to said pipe inner wall, which is in fluid communication with said pipe passageway through perforations in the pipe through which said liquid droplets and solids pass.

10. The apparatus of claim 9 wherein said angle between said planar surfaces is about 60°.

11. The apparatus of claim 9 wherein said receptacle terminates at least 1 inch from that end of said second edge closest said collecting means.

12. The apparatus of claim 11 wherein said receptacle terminates from about 1 to about 4 inches from said second edge end.

* * * * *